(12) United States Patent
Cappuccilli et al.

(10) Patent No.: US 11,127,216 B2
(45) Date of Patent: Sep. 21, 2021

(54) HUD SYSTEM AND METHOD FOR HUD IMAGE GENERATION

(71) Applicant: SAINT-GOBAIN GLASS FRANCE, Courbevoie (FR)

(72) Inventors: Michele Cappuccilli, Aachen (DE); Martin Arndt, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/612,553

(22) PCT Filed: Apr. 27, 2018

(86) PCT No.: PCT/EP2018/060859
§ 371 (c)(1),
(2) Date: Nov. 11, 2019

(87) PCT Pub. No.: WO2018/206314
PCT Pub. Date: Nov. 15, 2018

(65) Prior Publication Data
US 2020/0126305 A1    Apr. 23, 2020

(30) Foreign Application Priority Data

May 11, 2017   (EP) ..................................... 17170525

(51) Int. Cl.
*G06T 19/00*    (2011.01)
*B60K 35/00*    (2006.01)
(Continued)

(52) U.S. Cl.
CPC ............ *G06T 19/006* (2013.01); *B60K 35/00* (2013.01); *G02B 27/0103* (2013.01); *G09G 5/38* (2013.01);
(Continued)

(58) Field of Classification Search
None
See application file for complete search history.

(56) References Cited

U.S. PATENT DOCUMENTS 4,908,611 A * 3/1990 Iino ..................... B60R 11/02
345/7
5,497,170 A * 3/1996 Kato ..................... G02B 5/32
340/980
(Continued)

FOREIGN PATENT DOCUMENTS

DE    10 2014 212186 A1    12/2015
DE    10 2014 224189 A1    6/2016
(Continued)

OTHER PUBLICATIONS

International Search Report as issued in International Patent Application No. PCT/EP2018/060859, dated Jul. 2, 2018.

*Primary Examiner* — David H Chu
(74) *Attorney, Agent, or Firm* — Pillsbury Winthrop Shaw Pittman LLP

(57) ABSTRACT

An HUD system, includes at least one first HUD device, namely an AR-HUD device, with at least one first image source for displaying a first image produced by at least one hologram in a first display section of a display region and at least one second HUD device with at least one second image source for displaying a second image produced using geometric projection optics in a second display section of the display region.

12 Claims, 1 Drawing Sheet

(51) Int. Cl.
*G02B 27/01* (2006.01)
*G09G 5/38* (2006.01)

(52) U.S. Cl.
CPC .......................... *B60K 2370/1529* (2019.05); *B60K 2370/166* (2019.05); *B60K 2370/167* (2019.05); *B60K 2370/177* (2019.05); *B60K 2370/23* (2019.05); *B60K 2370/29* (2019.05); *G02B 2027/0141* (2013.01); *G06T 2200/24* (2013.01); *G09G 2354/00* (2013.01)

(56) References Cited

U.S. PATENT DOCUMENTS

| | | | |
|---|---|---|---|
| 2009/0067057 A1* | 3/2009 | Sprague | G02B 27/0101 359/630 |
| 2015/0116800 A1* | 4/2015 | Yoshida | G02B 27/0103 359/9 |
| 2015/0346491 A1* | 12/2015 | Christmas | H04N 9/3185 359/9 |
| 2017/0334341 A1* | 11/2017 | Kurashige | F21S 41/675 |
| 2020/0276793 A1* | 9/2020 | Ayoub | B32B 17/10036 |

FOREIGN PATENT DOCUMENTS

| | | |
|---|---|---|
| EP | 2 894 509 A1 | 7/2015 |
| WO | WO 2016/091435 A1 | 6/2016 |
| WO | WO 2016/198678 A1 | 12/2016 |

\* cited by examiner

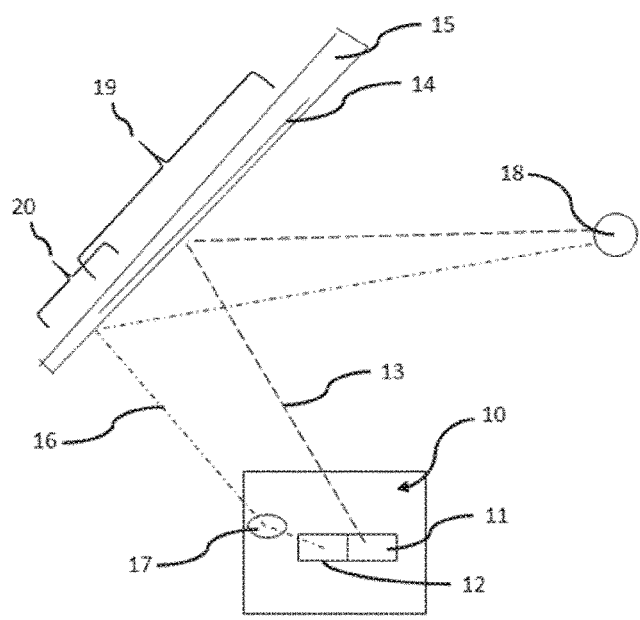

HUD SYSTEM AND METHOD FOR HUD IMAGE GENERATION

CROSS-REFERENCE TO RELATED APPLICATIONS

This application is the U.S. National Stage of PCT/EP2018/060859, filed Apr. 27, 2018, which in turn claims priority to European patent application number 17 170 525.4, filed May 11, 2017. The content of these applications are incorporated herein by reference in their entireties.

The invention comprises an HUD system and a method for HUD image generation.

Head-up displays head-up displays (HUDs) are basically known in the prior art. A conventional head-up display (HUD) is described, for example, in WO 2016/091435 A1. Such conventional HUDs are usually used for status displays displays, such as a (current) speed. Also known are so-called augmented-reality HUDs (hereinafter: AR-HUD), in which contact-analog representations, such as navigation and ACC instructions (where ACC stands for Adaptive Cruise Control) are used. An AR-HUD is described, for example, in WO 2016/198678 A1. DE 10 2014 212 186 A1 describes, among other things, holographic optics for various applications, for example, for a conventional head-up display, a contact-analog head-up display, or the like.

In order to provide (simultaneously) both an HUD for status displays and an AR-HUD, two image sources are, in principle, necessary in one HUD-projector (one for the standard HUD and one for the AR-HUD). However, since the image widths of standard HUD and AR-HUD are usually significantly different from one another, two different wedge angles would have to be introduced into one (vehicle) pane in order to ensure optimum image quality for both HUDs. It is particularly problematic that display regions of the standard HUD and of the AR-HUD can (partially) overlap.

In addition to HUDs that operate with conventional optics, it is also known to operate with holograms. For example, an HUD system is known from DE 10 2014 224 189 A1, in which an overall image is realized by using sub-holograms. In DE 10 2014 224 189 A1, it is also generally pointed out that a hologram-based display can be combined with a display produced by means of geometric projection optics. Similarly, EP 2 894 509 A1 describes multiple displays, namely a combination of a windshield field of vision display and a holographic projection display embedded in the windshield in the region of the base of a pane. However, in principle, a display using holograms (as described, for example, in DE 10 2014 224 189 A1) requires a not insignificant outlay such that conventional systems (that operate without a hologram) are often preferred.

The object of the present invention is to propose an HUD system and a corresponding method capable of producing appealing images with the least possible outlay and, in particular, with the least possible space requirement, both for status displays (such as current speed) and an AR display.

This object is accomplished by an HUD system according to claim 1. Preferred embodiments emerge from the dependent claims.

The object is further accomplished by a method for image generation according to claim 11. A vehicle according to the invention is proposed in claim 10. Preferred embodiments emerge from the dependent claims.

The HUD system according to the invention comprises at least one first HUD device, namely an AR-HUD device, with at least one first image source for displaying a first image produced by means of at least one hologram in a first display section of a display region and at least one second HUD device for displaying a second image produced (conventionally or in geometric projection optics) in a second display section of the display region.

In the context of the invention, the term "AR-HUD device" (augmented reality head-up display) means a so-called "contact-analog HUD device", in which (in contrast to a conventional HUD) not only is information projected onto a limited region of the windshield, but also elements of the external environment are included in the representation. Examples of this are marking a pedestrian, displaying the distance to a preceding vehicle, or projecting navigation data directly on the road, for example, for marking the lane to be selected. The contact-analog HUD has, in particular, a projection distance of at least 5 m, whereas, with a static HUD, the projection distance is significantly shorter, typically approx. 2 m. In the context of the invention, the "projection distance" refers to the distance between the virtual image and the viewer, i.e., usually the head of the driver. The projection distance is preferably at least 7 m. The projection distance is preferably at most 15 m.

A core concept of the invention consists in proposing a special hybrid HUD system in which at least AR images can be produced using at least one hologram and, simultaneously, images can be produced (in conventional projection optics) without a hologram, in particular for a status display. Here, according to the invention, it was recognized that by means of such a combination, both visually appealing AR-HUD images and also readily recognizable standard images, in particular for status displays, can be produced. It was taken into account that for authentic AR-HUD images, comparatively large projection widths are necessary (as described, for example, in WO 2016/198678 A1). On the other hand, it is also advantageous (for example, for status displays) to have a capability of displaying images with a different (in particular, smaller) projection width (as described, for example, in WO 2016/091435 A1). In particular, it was also recognized according to the invention that with a satisfactory use of AR-HUD and standard HUD (for status displays and the like) with conventional imaging, two different wedge angles would have to be introduced into the pane in order to ensure optimum image quality for both HUDs. As already described above, it is, however, problematic that the display regions of standard HUD and AR-HUD can also partially overlap. For AR-HUD, the use of holograms eliminates the necessity of a wedge device (e.g., wedge film, see, for example, WO 2016/091435 A1, referred to there as thermoplastic intermediate layer). In other words, by using the hologram technique, the wedge shape of such a wedge device can be (optimally) adapted to the second HUD device. Overlapping of the display sections is then not problematic. One concept of the invention also consists additionally in that conventional HUD technology (without holograms) was not entirely dispensed with; but, indeed, the second HUD device operates in particular even without holograms. As a result, a comparatively simple and robust structure can be used (preferably for status displays). In principle, a comparatively high space requirement is, to be sure, associated with conventional systems. However, since the second HUD device is used only for certain images (in particular status displays), the space requirement remains acceptable since it is possible to stay within a specific (small) projection width range. Thus, on the whole, with the present system, an advantageous compromise between outlay (in particular in production) and space requirement is obtained such that a system can be realized that is variable and economically producible, yet requires little installation space. In particular, it also takes advantage of the fact that a second projector, which is used in a conventional HUD, is comparatively inexpensive to implement (compared to a second hologram). Due to the AR-HUD device, comparatively complex geometries and designs of the display region (e.g., the windshield) can, optionally, be realized. The vertical radius of curvature of current standard HUD panes is 4000-12000 mm. With the AR-HUD device, radii (significantly) below 4000 mm can, optionally, be realized (without serious distortions of the HUD image).

An image produced using geometric projection optics is, in particular, an image that is produced without the use of holograms. A central element of conventional projection optics can be a reflection element (mirrors, in particular concave mirrors) which magnifies the image. In a holographic HUD, individual holographic optical elements (HOEs), for example, can assume this function. The first HUD device (HOE-HUD) preferably comprises a projector (for example, in the dashboard of the vehicle) and a holographic device (film) with a hologram stored therein, for example, in the windshield. In a manner analogous to that of an HUD with conventional optics, an image can be produced in the projector and, optionally, magnified via flat and/or concave mirrors, and deflected to the display region (pane). When this light strikes the hologram film preferably integrated in the display region (in the pane), it can be diffracted on interference patterns that are stored in the hologram device (hologram film). Through the physical effect of diffraction, different optical functions can be assumed by the hologram, also including, optionally, the task of complex lenses, mirrors, and/or prisms. Since, as explained above, the HOEs can assume the optical function of a concave mirror, the installation space in the dashboard required for a certain (virtual) image size decreases accordingly, since the optical elements (e.g., flat and/or concave mirrors) in an AR-HUD projector can be designed smaller than with an HUD with conventional optics. In this case, the hologram in the display region (in the windshield) can assume at least large part of image magnification. However, through the effect of diffraction, not only optical functions can possibly be assumed by the hologram, but also, optionally, angles of incidence and reflection of the light can be decoupled (with the HUD with conventional optics, "angle of incidence=angle of reflection" always applies to reflection on the pane, i.e., the two angles are coupled to one another). Thus, with the AR-HUD (HOE-HUD) according to the invention, the need for a wedge device (e.g., wedge film or wedge-shaped PVB, where PVB stands for polyvinyl butyral) is eliminated.

The first and the second display section can overlap completely or partially (in particular, only partially). Alternatively, the first and second display section can be (completely) separated from one another. In a specific embodiment, a lower end of the first display section is situated below a lower end of the second display section (for example, in a windshield). Particularly in the case of overlapping display sections, it is especially advantageous to use the first and second HUD device according to the invention since, with the proposed combination of the HUD devices, a single wedge angle can suffice in the display region (windshield).

Optionally, a complete overlapping of two (virtual) images with two different image with can be achieved. For example, on the one hand, a (character-based or pictogram-based) contact-analog representation can be realized; and, on the other, an explanatory text that overlays and thus captions the pictogram can be realized.

In general, the display region can be defined by a vehicle window (preferably by a windshield). Alternatively, or additionally, the display region can be defined by another vehicle pane (e.g., rear panel window, side window, and/or roof panel).

The display region can be used in a vehicle, in particular a motor vehicle, preferably a passenger car and/or truck, in a watercraft and/or in a rail vehicle (or train), and/or in an aircraft, in particular for conveyance of persons and/or cargo (e.g., an airplane and/or a helicopter).

The vehicle pane (windshield) can include an outer pane and an inner pane that are, optionally, joined to one another via a preferably thermoplastic intermediate layer. The vehicle pane (windshield) is intended, in a window opening of a vehicle, to separate the interior from the external environment. The term "inner pane" refers to the pane of the composite pane facing the interior (vehicle interior). "Outer pane" refers to the pane facing the external environment.

The vehicle pane (windshield) can have an upper edge and a lower edge. "Upper edge" refers to the side edge that is intended to point upward in the installed position. "Lower edge" refers to the side edge that is intended to point downward in the installed position. The upper edge is often referred to as the "roof edge"; and the lower edge, as the "engine edge". The beam that extends between the projector and the center of the eye box is commonly referred to as the "center beam". It is a characteristic reference beam for the design of a HUD projection arrangement. The point at which the center beam strikes the inner pane can be referred to as the HUD reference point. The HUD reference point is preferably within the HUD region, typically roughly in the center.

A thickness of the intermediate layer can be variable in the vertical course between the upper edge and the lower edge of the windshield, at least in sections. Here, "in sections" means in particular that the vertical course between the upper edge and the lower edge has at least one section in which the thickness of the intermediate layer changes depending on location, i.e., the intermediate layer has a wedge angle. The thickness of the intermediate layer is preferably variable, at least in the HUD region. The thickness can, however, also change in multiple sections or increase monotonically in the entire course, for example, from the lower edge to the upper edge. The term "vertical course" refers to the course between the upper edge and the lower edge with the direction of the course being substantially perpendicular to the upper edge. Since, in windshields, the upper edge can deviate greatly from a straight line, the vertical course is more precisely aligned perpendicular to the connecting line between the corners of the upper edge. The intermediate layer has, at least in sections, a finite wedge angle, i.e., an edge angle greater than 0°, namely in the section in which the thickness is variable.

"Wedge angle" refers to the angle between the two surfaces of the intermediate layer. If the wedge angle is not constant, the tangents on the surface must be used for its measurement at one point.

The wedge angle is preferably variable at least in the second display section. Preferably, the wedge angle increases in the vertical course from an upper end of the second display section to a lower end of the second display section, in particular, monotonically. With such a wedge angle profile, ghost images resulting from double reflection of the projector image can be effectively avoided for various eye positions.

The display region, in particular the vehicle pane (outer pane and/or inner pane) contains (contain) preferably glass, in particular soda lime glass. However, the display region, in particular the vehicle pane (outer pane and/or inner pane) can, in principle, also contain other types of glass, such as quartz glass or borosilicate glass, or even rigid clear plastics, in particular polycarbonate or polymethyl methacrylate. The thickness of the display region, in particular of the vehicle pane (outer pane and/or inner pane) can vary (widely). Advantageously, the individual panes have, in each case, a thickness that is a maximum of 5 mm, preferably a maximum of 3 mm. Preferably, panes with a thickness in the range from 0.8 mm to 5 mm, preferably from 1.4 mm to 2.5 mm are used, for example, those with the standard thicknesses of 1.6 mm or 2.1 mm.

The (thermoplastic) intermediate layer preferably contains at least one thermoplastic polymer, preferably ethylene vinyl acetate (EVA), polyvinyl butyral (PVB), or polyurethane (PU) or mixtures or copolymers or derivatives thereof, particularly preferably PVB. The minimum thickness of the (thermoplastic) bonding layer (bonding film) is preferably from 0.2 mm to 2 mm, particularly preferably from 0.3 mm to 1 mm. "Minimum thickness" refers to the thickness at the thinnest point of the intermediate layer. The (thermoplastic) intermediate layer is preferably formed by at least one thermoplastic bonding film with variable thickness, a so-called "wedge film" with a variable wedge angle, at least in sections. The thickness of the intermediate layer can be constant in horizontal cross-sections (i.e., cross-sections roughly parallel to the upper edge and the lower edge). In that case, the thickness profile over the width of the composite glass is constant. The thickness can, however, also be variable in horizontal cross-sections. In that case, the thickness is variable not only in the vertical course but also in the horizontal course.

The intermediate layer can be implemented by a single film or even by more than one film. In the latter case, at least one of the films can be implemented with the wedge angle. The intermediate layer can also be implemented as a so-called "acoustic film" that has a noise-damping effect, or contain such a film. Such films consist of at least three plies, wherein the middle ply has higher plasticity or elasticity than the outer layers surrounding it, for example, as a result of a higher plasticizer content.

The second image preferably includes at least one status display (such as a speed, a mileage, an engine speed, an (inside and/or outside) temperature and/or a fuel gauge). The first image preferably includes at least one marking of an element of a vehicle environment, such as a lane boundary, another road user, e.g., a pedestrian and/or another vehicle, and/or a navigation instruction (directly) on a surface of the vehicle environment, in particular a traffic lane, for example, one or more arrows for direction data and/or traffic lane boundary symbols. The first image (or element of the first image) can preferably be produced at a first projection distance. The second image (or an element of the second image) can preferably be produced at a second projection distance. Particularly preferably, the first projection distance is greater than the second projection distance. "Projection distance" means, in particular, the distance between the (virtual) image (in particular, a lower edge or end of the image) and the viewer, i.e., usually, viewer's head. A location that has a (horizontal) distance of (approx.) 1 m from the center point of a left (optionally, right) half of the display region (the windshield) can, for example, be assumed as the location of the viewer (viewer's head).

Preferably, an image can be produced as the first image (or as an element of the first image) at a projection distance of at least 5 m, preferably at least 10 m. Alternatively, or additionally, an image can be produced as the second image (or as an element of the second image) at a projection distance of at most 4.5 m, preferably at most 2.5 m.

The projection distance of the first image (or of an element of the first image) can preferably vary (for example, over a range of at least 10 m, i.e., for example, between 5 and 15 m) or can be constant. The projection distance of the first image (or of an element of the first image) can, optionally, also vary (at least over a small range of, for example, 0.5 m, i.e., for example, between 1.5 and 2.5 m). The projection distance of the second image (or of an element of the second image) can, however, also be fixed (for example, at 2 m).

The first HUD device can also be considered a contact-analog HUD device. The second HUD device can also be considered a static HUD device.

In a specific embodiment, a wedge device, in particular a wedge film, is introduced into the display region, in particular at least into the second display section.

The first and second HUD device can be (at least partially) accommodated in a common structural unit (in particular a common projector). Alternatively, or additionally, the first and second HUD devices have at least one common component, such as at least one common reflector, in particular one common (last) aspherical mirror, and/or at least one common lens. The HUD devices can differ in particular through their own image source and hologram device (e.g., hologram film) in each case as a component of the first HUD device and preferably a concave mirror, that is associated only with the second HUD device (wherein the concave mirror is, possibly, not traversed by light for generating the first image). The wedge device (wedge film) is also, in particular, a component of the second HUD device, which does not, however, rule out the possibility that light from the first image source may also traverse the wedge device.

The first and second image source can be accommodated in a common structural unit (e.g., a common projector). Alternatively, the first and second image source can be spatially separated (e.g., have a distance between them of at least 30 cm or at least 50 m or at least 100 cm). For example, the first image source can be positioned on or in the roof (roof liner) of a vehicle. In particular, this is advantageous for comparatively steep display regions (e.g., at an angle of less than 45° or less than 20° or less than 10° relative to the vertical) (in a truck or other vehicles with a relatively steep windshield).

According to the invention, a vehicle is also proposed, in particular, a motor vehicle that includes an HUD system of the above type. Specifically, the motor vehicle can be a motor vehicle with a windshield (which then advantageously forms or defines the display region).

The above-mentioned object is further accomplished by a method for HUD image generation, in particular using an HUD system or a vehicle of the above type, comprising the steps:

Generating a first image, namely an AR-HUD image, using at least one hologram, and Generating a second image, without using a hologram.

The first image (or an element of the first image) is produced at a first projection distance. The second image (or an element of the second image) is produced at a second projection distance. The first projection distance is preferably greater than the second projection distance.

Preferably, an image is produced at a projection distance of at least 5 m, preferably at least 10 m as the first image (or as an element of the first image). Alternatively, or additionally, an image is produced at a projection distance of at most 4.5 m, preferably at most 2.5 m as the second image (or as an element of the second image).

Calculation and determination of the projection distance can, in particular, also be derived from WO 2016/198678.

The AR-HUD device is preferably adapted to the individual place of use (e.g., vehicle), for example, by using calculations and/or simulations.

The invention is explained in detail with reference to a drawing. The drawing is a schematic representation and is not to scale. The drawing in no way restricts the invention.

It depicts:

FIG. 1 a schematic view of an HUD system according to the invention.

A projector 10 includes a first image source 11 and a second image source 12. The first image source 11 sends beams via a first beam path 13, depicted by way of example, in the direction of a holographic film 14 in a windshield 15 of a vehicle (not shown in its entirety). A hologram is stored in the holographic film (in particular the polymer film) 14. In a manner analogous to that of an HUD system with conventional optics, an image is produced in the projector 10, magnified by flat and concave mirrors (not shown in detail), and deflected toward the pane. When (for example, via the beam path 13) this light strikes the film 14 (hologram film) integrated into the pane, it is diffracted on interference patterns that are stored in the hologram film. Here, the holographic film 14 also assumes the function of a concave mirror since the (virtual) HUD image can be magnified many times over. The installation space (for example, in the dashboard) required for a specific (virtual) image size drops accordingly since the flat and concave mirrors in the projector 10 (not shown in detail) can be designed smaller than in the case of an HUD with (purely) conventional optics. The holographic film 14 and the windshield 15 takes over a large part of the image magnification. The viewer's head is schematically illustrated by the reference character 18. The use of a wedge device (e.g., wedge film) is not necessary for this holographic image generation.

In parallel, a second image source 12, for which, at least partially, the same mirrors can be used in the projector as for the first image source 11 (e.g., a last aspherical mirror), is also provided in the projector 10. Since image size and image width are comparatively small in the standard HUD, the installation space requirement does not increase (or hardly increases). The light from the second image source 12 is also deflected via a second beam path 16 onto the windshield windshield 15, and, specifically, via a concave mirror 17. Furthermore, a wedge-shape is introduced into the windshield 15 (for example, via a wedge film, as described in WO 2016/198678 A1). However, this wedge shape does not adversely affect the function of the HOE-HUD.

Images from the first image source can be displayed in a first display section 19. Images from the second image source can be displayed in a second display section 20.

As a result, with this combination of HOE-HUD and HUD with conventional optics, a hybrid HUD satisfying high requirements can be produced.

LIST OF REFERENCE CHARACTERS 10 projector
11 first image source
12 second image source
13 first beam path
14 holographic film
15 windshield
16 second beam path
17 concave mirror
18 viewer
19 first display section
20 second display section

The invention claimed is:

1. HUD system, comprising at least one first HUD device, which is an AR-HUD device, with at least one first image source for displaying a first image produced by means of at least one hologram in a first display section of a display region and at least one second HUD device with at least one second image source for displaying a second image produced using geometric projection optics in a second display section of the display region,
   wherein the display region is defined by a vehicle window which is a windshield,
   wherein a wedge device is introduced into the display region, wherein the wedge device is a wedge film that is introduced into the second display section,
   wherein the first and the second display section only partially overlap or are separated from one another, wherein a lower end of the second display section is situated below a lower end of the first display section.

2. The HUD system according to claim 1, wherein the second image has at least one status display.

3. The HUD system according to claim 1, wherein the first image includes at least one marking of an element of a vehicle environment, another road user, and/or a navigation instruction on a surface of the vehicle environment.

4. The HUD system according to claim 1, wherein the first image or an element of the first image can be produced at a first projection distance and the second image or an element of the second image can be produced at a second projection distance, wherein the first projection distance is greater than the second projection distance.

5. The HUD system according to claim 4, wherein an image can be produced at a projection distance of at least 5 m as the first image or as an element of the first image, and/or an image can be produced at a projection distance of at most 4.5 m as the second image or as an element of the second image.

6. The HUD system according to claim 1, wherein the first and second HUD devices are accommodated at least partially in a common structural unit and/or have at least one common component.

7. Vehicle, including an HUD system according to claim 1.

8. The HUD system according to claim 2, wherein the at least one status display is for displaying a speed, a mileage, an engine speed, a temperature, and/or a fuel gauge.

9. The HUD system according to claim 3, wherein the at least one marking relates to a lane boundary, a pedestrian, another vehicle, and/or a traffic lane.

10. The HUD system according to claim 5, wherein the image is produced at a projection distance of at least 10 m as the first image or as an element of the first image, and/or the image is produced at a projection distance of at most 2.5 m as the second image or as an element of the second image.

11. The HUD system according to claim 6, wherein the common structural unit is a common projector and the at least one common component is a common reflector and/or a common lens.

12. The HUD system according to claim 11, wherein the common reflector is an aspherical mirror.

* * * * *